(12) United States Patent
Kawando

(10) Patent No.: US 6,389,233 B2
(45) Date of Patent: May 14, 2002

(54) CAM MECHANISM FOR DEVICE HAVING POP-UP PART

(75) Inventor: Takahisa Kawando, Osaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/753,667

(22) Filed: Jan. 4, 2001

(30) Foreign Application Priority Data

Jan. 5, 2000 (JP) ........................................ 2000-000533

(51) Int. Cl.⁷ .............................................. G03B 15/03
(52) U.S. Cl. ....................... 396/177; 396/176; 396/178
(58) Field of Search ................................ 396/176, 177, 396/178

(56) References Cited

U.S. PATENT DOCUMENTS 5,329,327 A * 7/1994 Arai et al. .................. 396/177

FOREIGN PATENT DOCUMENTS

JP 417402 3/1992

* cited by examiner

*Primary Examiner*—David M. Gray
*Assistant Examiner*—Rochelle Blackman
(74) *Attorney, Agent, or Firm*—Birch, Stewart, Kolasch & Birch, LLP

(57) ABSTRACT

Cam mechanism with a flat or planar locking member and a cam member also having a flat or planar shape. The cam mechanism is operable as a pop-up mechanism. The cam member moves substantially in a first plane and the lock member is urged or driven substantially in the first plane by the cam member when the cam member moves from a first to a second position corresponding to extended and retracted positions, respectively, of a pop-up device. When the cam member reaches a predetermined position, the movement of the cam member is restricted by the locking member and the restriction of the movement of the cam member is released by moving the locking member in a direction perpendicular to the first plane. A spring energizes the lock in a member towards a direction in which the movement of the cam member is restricted.

37 Claims, 13 Drawing Sheets

CAM MECHANISM FOR DEVICE HAVING POP-UP PART

This patent application claims priority based on a Japanese patent application, 2000-533 filed on Jan. 5, 2000, the contents of which are incorporated herein by reference.

BACKGROUND OF THE INVENTION

The present invention relates to a cam mechanism. More specifically, the invention is directed to a cam mechanism that is operable with pop-up devices, such as a flash device, LCD monitor, or other similar devices.

Cameras typically include flash mechanisms, which generally can be extended from the body of a camera by a pop-up mechanism for operation of the flash during photography. An example of a pop-up device, in which the flash part moves between a retracted position and an extended position by operation of a rotary lever, is disclosed in a Japanese Patent Publication No. Hei. 4-17402 published in 1992.

It has, however, been found that use of a pop-up mechanism in photographic devices results in a gap between the casing of the photographic device and the pop-up part due to the pop-up part not being fully retained in the casing by the pop-up mechanism. Further, miniaturization of photographic devices is desirable, but conventional pop-up mechanisms tend to be relatively large in size thereby hindering miniaturization.

Accordingly, it would be desirable to provide an improved pop-up mechanism for extending and retracting pop-up parts, such as flash mechanisms, LCD displays, and the like, with the pop-up mechanism facilitating miniaturization, while having robust functionality.

The difficulties and limitations suggested in the preceding are not intended to be exhaustive, but rather are among many which demonstrate that prior art pop-up mechanisms of the type described herein will admit to worthwhile improvement.

SUMMARY OF THE INVENTION

It is, therefore, a general object of the invention to provide an improved pop-up mechanism, which will obviate or minimize difficulties of the type previously described.

It is a specific object of the invention to provide a cam mechanism operable with a pop-up device.

It is another specific object of the invention to provide a cam mechanism which is easy to assemble.

It is yet another specific object of the invention to provide a cam mechanism which facilitates miniaturization.

It is yet another specific object of the invention to provide a cam mechanism having substantially planar parts that move substantially in one plane and in a direction perpendicular to the plane.

It is yet another specific object of the invention to provide a cam mechanism having relatively few parts, while providing robust functionality.

A cam mechanism operable to achieve at least some of the foregoing objects includes a cam member for movement substantially in a first plane and a lock member for movement substantially in the first plane when the cam member moves from a first position to a second position. The lock member retains the cam member at a predetermined position and releases the cam member by movement of the lock member in a direction substantially perpendicular to the first plane.

The cam mechanism also includes a first spring for moving the lock member to a position for retaining the cam member and a second spring for moving the cam member, wherein the lock member restricts movement of the cam member caused by the second spring. Furthermore, the cam mechanism includes a third spring for moving the lock member in an opposite direction to the perpendicular direction.

Preferably, the first spring and the third spring are formed integrally as a torsion spring with one end of the torsion spring causing the lock member to move in the first plane, and the other end of the torsion spring causing the lock member to move in the opposite direction to the perpendicular direction. When the cam member is moved in the opposite direction to the movement by the second spring, with the restriction of the movement of the cam member being released, the lock member is moved in substantially in the first plane in the opposite direction to the movement caused by the first spring.

The cam mechanism further includes a first axis for supporting the lock member in a rotatable way and a second axis for supporting the cam member in a rotatable way, wherein the first spring causes movement of the lock member in a first rotary direction about the first axis and the second spring causes movement of the cam member in a second rotary direction about the second axis.

Preferably, the lock member includes a through-hole for receiving the first axis and a gap, sufficient for movement of more than one part of the lock member towards an axis, is provided between the lock member and the first axis. A collar is provided at the first axis having a diameter greater than the diameter of the through-hole to retain through-hole from movement along the axis.

Preferably, the cam member includes a guide part formed in a surface thereof parallel with the first plane and the lock member is urged toward a track where the lock member is moved by the guide part. Preferably, a convex part is provided to protrude in a perpendicular direction to the first plane and disposed on one side of contacting portions of the lock member and the cam member. Preferably, the lock member includes an engaging part for engaging with the cam member, and the cam member is retained by the engaging part being moved by the first spring when the cam member reaches a predetermined position. More preferably, the engaging part causes the cam member to move in an opposite direction to the direction of the movement caused by the second spring when the engaging part retains the cam member by being moved by the first spring.

Preferably, a range of movement of the cam member is limited to between a first position of the cam member when the cam member is released for movement and a second position of the cam member when the lock member engages therewith.

Preferably, the cam mechanism further includes a spring support part for charging and supporting the second spring for the second spring to move the cam member. Preferably, a combination of a cam mechanism according to the invention and a device having a pop-up part, such as a camera, is provided.

BRIEF DESCRIPTION OF THE DRAWINGS

Other objects and advantages of the present invention will become apparent from the following detailed description of preferred embodiments thereof taken in conjunction with the accompanying drawings, wherein.

DETAILED DESCRIPTION OF THE INVENTION

In the detailed description of the present invention, reference is made to a digital camera. This reference is not intended to limit the scope of the invention. It is envisioned that a cam mechanism of the type described herein may be used with many devices having a part that may be moved between positions, for example, by spring-loaded movement. As used herein, spring-loaded movement refers to movement that is energized or caused by application of a spring. It is believed that the cam mechanism of the present invention has applicability in photographic devices, electronic devices, computers, automobiles, and the like.

Further, the terms lock rotary spring and cam rotary spring that are used hereinafter correspond to the terms a torsion spring (as a preferred embodiment) and a second spring of the claims, respectively. The terms axial movement part and rotary movement part of the lock rotary spring that are used hereinafter correspond to the terms one part of the torsion spring and the other part of the torsion spring of the claims, respectively.

Figure 1A:
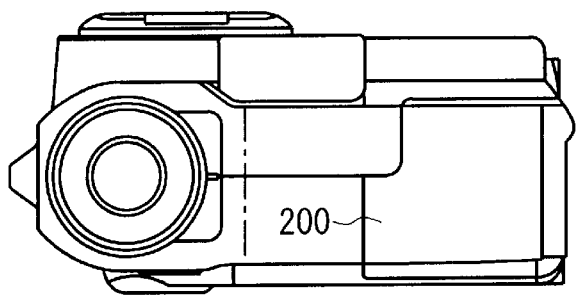
FIGS. 1A, 1B, and 1C are top, front and right side views, respectively, of a digital camera in accordance with the present invention.
Figure 1B:
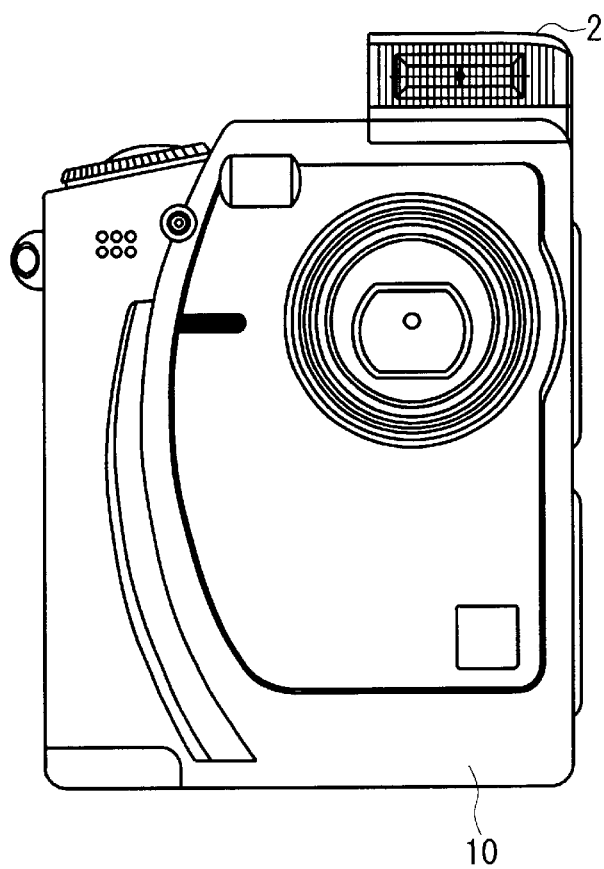
Figure 1C:
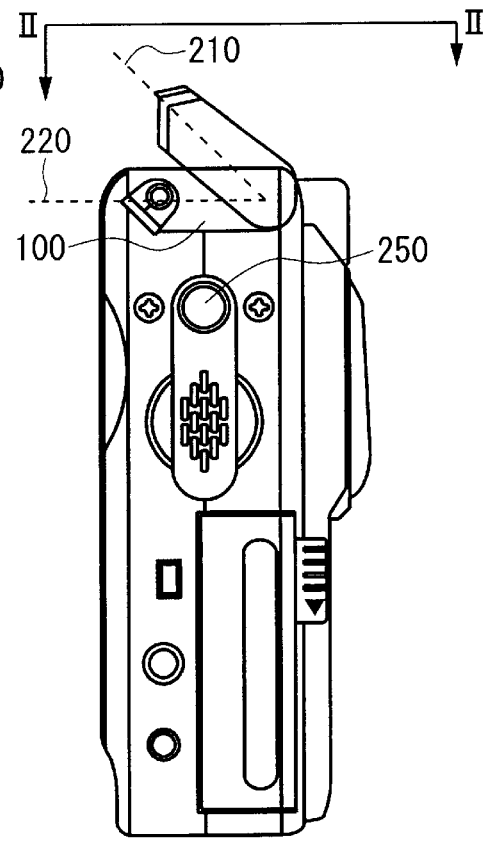

FIGS. 1A, 1B, and 1C are top, front, and right side plan views, respectively, of a digital camera 10. The digital camera 10 includes a flash part 200, a container part 100 for retaining the flash part 200, and a lock release or flash button 250. The flash part 200 is movable between a retracted position 220, at which the flash point 200 is in the container part 100, and an extended position 210, at which the flash part 200 protrudes from the body of the digital camera 10 in a position to be used. When the flash button 250 is pushed by a user, the flash part 200 pops up toward the extended position 210 from the retracted position 220. This movement is performed by way of a pop-up operation of a cam mechanism 300, shown in FIG. 2 in a preferred embodiment of the present invention.

Figure 2:
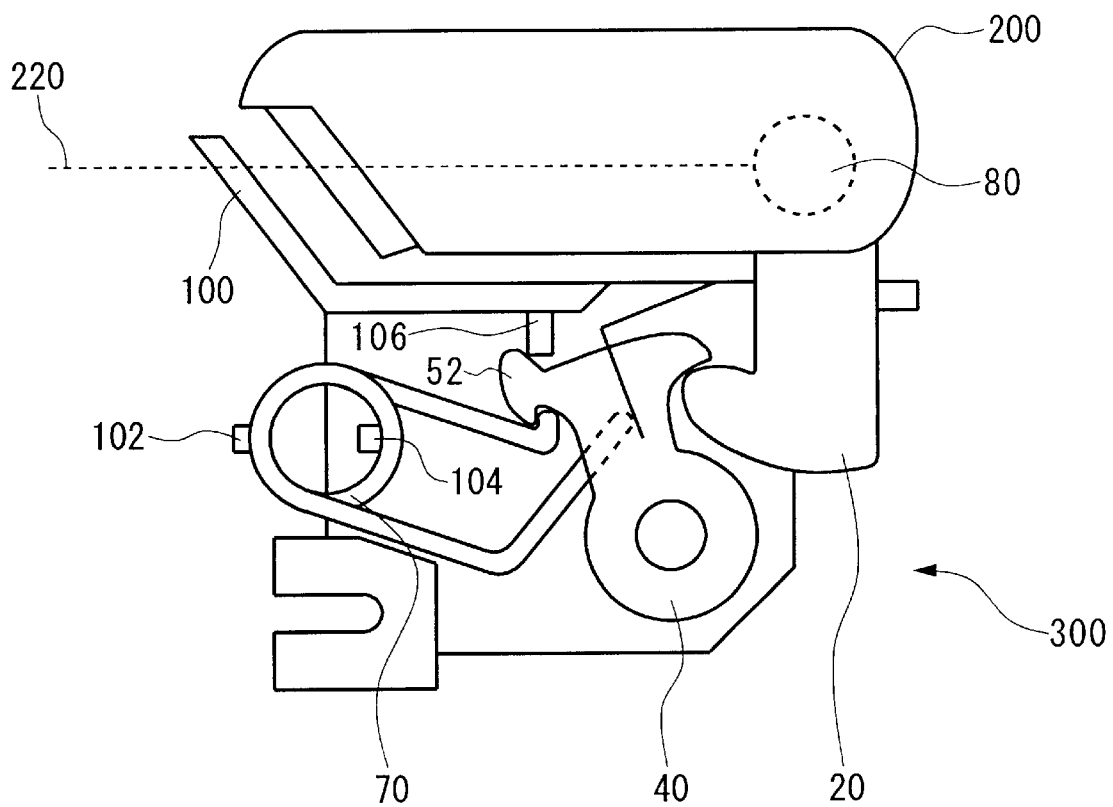
FIG. 2 is a partial right side view of the digital camera, partially in cross-section, taken along section line II—II in FIG. 1C, illustrating a cam mechanism in accordance with the present invention with the flash part at a retracted position.

FIG. 2 is a partial cross-sectional view of the right side of the flash part 200 and the container part 100, with the flash part 200 at the retracted position 220, and the cam mechanism 300 installed therein. The container part 100 has spring hooks 102 and 104 and a lock control part 106. The cam mechanism 300 (described in more detail hereinafter) includes a cam member 20, a cam rotary shaft 80, and a lock member 40.

Figure 3:
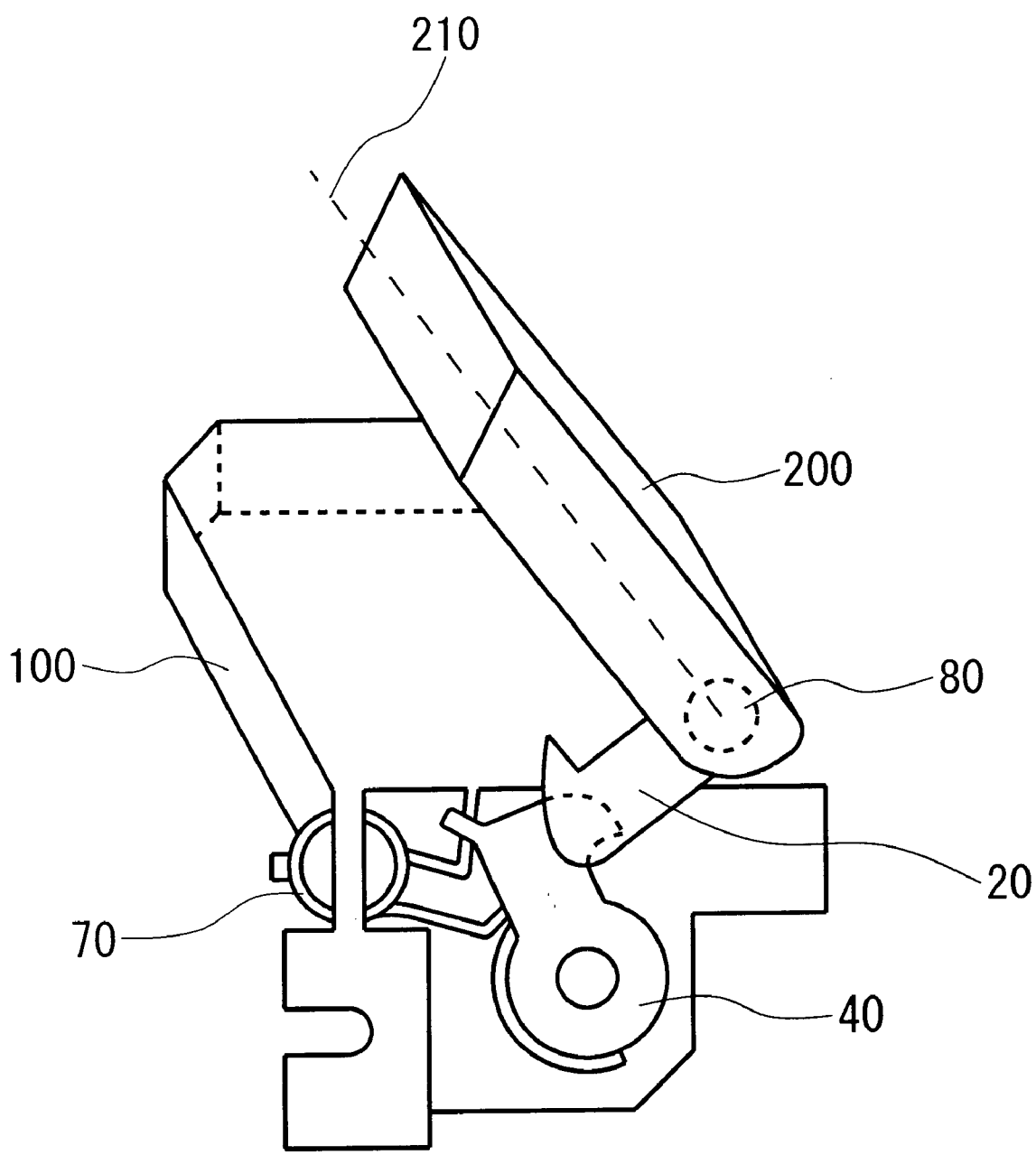
FIG. 3 is a perspective view of FIG. 2 with the flash part at an extended position.

Referring also to FIG. 3, the cam rotary shaft 80 connects the cam member 20 and the flash part 200 such that the flash part 200 moves with the cam member 20 in the same rotary direction. The cam member 20 and the lock member 40 engage (as shown in FIG. 2) when the flash part 200 is in the retracted position 220. A lock rotary spring 70 is supported in the container part 100 by way of spring hooks 102 and 104. A lock control part 106 engages with a rotary control part 52 (also shown in FIG. 2) formed in a convex shape in the lock member 40. The specific structure and function of the cam mechanism 300 are described with reference to FIG. 4 and the succeeding figures thereafter.

FIG. 3 shows in perspective view the flash part 200, the container part 100, and the cam mechanism 300 installed therein with the flash part 200 positioned at the extended position 210. The engagement between the cam member 20 and the lock member 40 is disengaged, and then the flash part 200 is moved in a clockwise direction, about the cam rotary shaft 80 as the pivot, toward the extended position 210 by application of a loaded spring.

Figure 4:
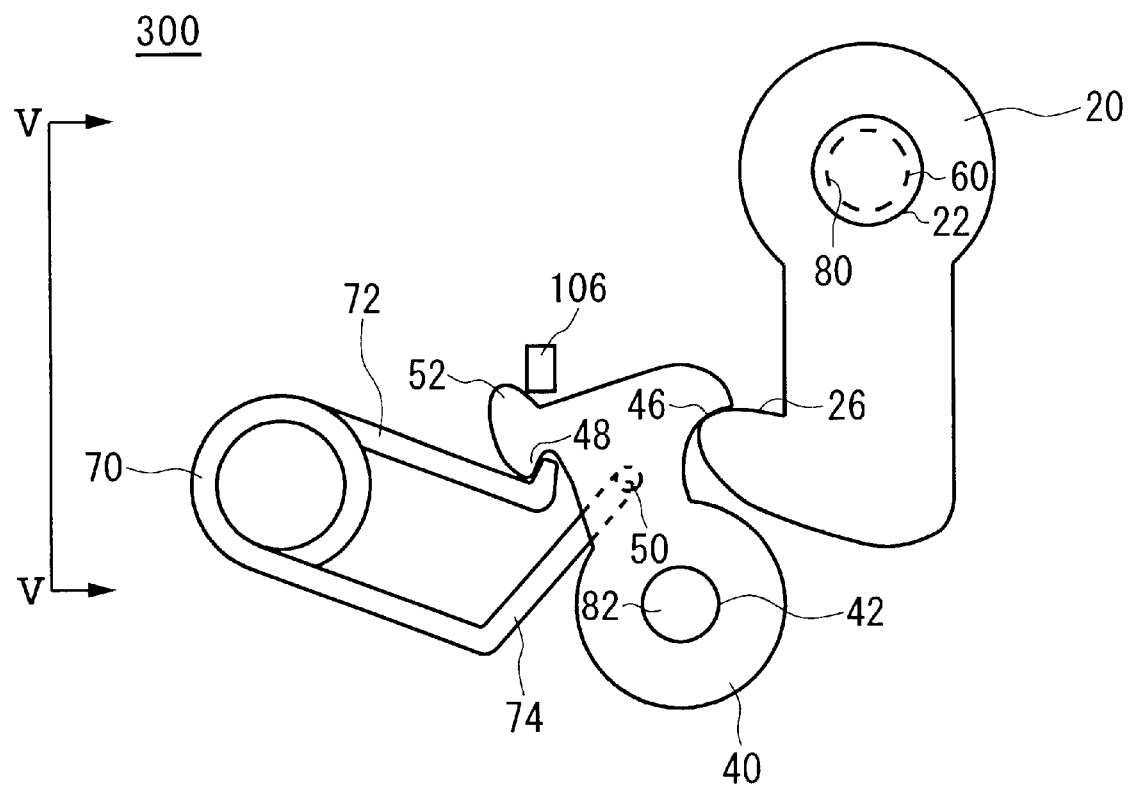
FIG. 4 illustrates the cam mechanism in accordance with the invention when the flash part (not shown) is at the retracted position.

FIG. 4 illustrates the cam mechanism 300 when the flash part 200 (not shown in this figure) is positioned at the retracted position 220. The cam mechanism 300 includes the cam member 20, a cam rotary spring 60, the cam rotary shaft 80, the lock member 40, the lock rotary spring 70, and a lock rotary shaft 82.

The cam member 20 includes a cam through-hole 22 for the cam rotary shaft 80 and a cam engaging part 26 for engaging the lock member 40. The lock member 40 includes a lock through-hole 42 for the lock rotary shaft 82, a lock engaging part 46 for engaging the cam member 20, a downward projecting hook part 48 for engaging the lock rotary spring 70, an inner side hook part 50, and the rotary control part 52 for engaging the lock control part 106. Preferably, the lock rotary spring 70 is a torsion spring, and includes, at one end, a rotary movement part 72 for rotating the lock member 40 and further includes, at the other end, an axial movement part 74 for moving the lock member 40 in the axial direction with respect to the axis 82.

The cam rotary shaft 80 extends through the cam through-hole 22 such that the cam member 20 is rotatable about the axis 80. The cam rotary spring 60 fits on the cam rotary shaft 80, and rotates the cam member 20 in the clockwise direction, about the axis of the cam rotary shaft 80 as the pivot. The lock rotary shaft 82 extends through the lock through-hole 42 and supports the lock member 40 to be rotatable about the axis 82. The rotary movement part 72 of one end of the lock rotary spring 70 engages the downward protecting hook part 48 and moves the lock member 40 in the clockwise direction, about the lock rotary shaft 82 as the pivot. The axial movement part 74, at the other end of the lock rotary spring 70, engages the inner side hook part 50 and moves the lock member 40 in the axial direction to the lock rotary shaft 82 (described in further detail below with reference to FIG. 5). Further, the movement toward the clockwise direction by the lock member 40 is limited by the lock control part 106.

Preferably, the cam rotary spring 60 and the rotary movement part 72 exert different rotary pressures such that the pressure applied on the lock member 40 by the rotary movement part 72 is greater than the pressure on the cam member 20 by the cam rotary spring 60. Therefore, the lock engaging part 46 pushes the cam engaging part 26 in the opposite direction, namely the counterclockwise direction, to the direction of the push caused by the cam rotary spring 60 so that the cam engaging part 26 is retained at a predetermined position by the lock engaging part 46. When the rotary control part 52 engages the lock control part 106, the clockwise movement of the lock member 40 is stopped, and the lock engaging part 46 engages with the cam engaging part 26. The respective widths along the axial direction of the cam engaging part 26 and the lock engaging part 46 are sufficient for the parts to engage each other.

As other preferred embodiments, the width of the cam engaging part 26 can be formed in such a way that the width thereof may be wider than the width necessary for it to engage the lock engaging part 46. In this, contact between the cam engaging part 26 and the lock engaging part 46 is maintained even if the lock member 40 is pushed inwardly somewhat. Further, the width of the lock engaging part 46 may be wider than the width necessary for engaging the cam engagement part 26. Furthermore, the widths of both the cam engaging part 26 and the lock engaging part 46 may be wider than necessary for their engagement. In this, a stable and reliable retention of the cam member 20 is provided.

Figure 5:
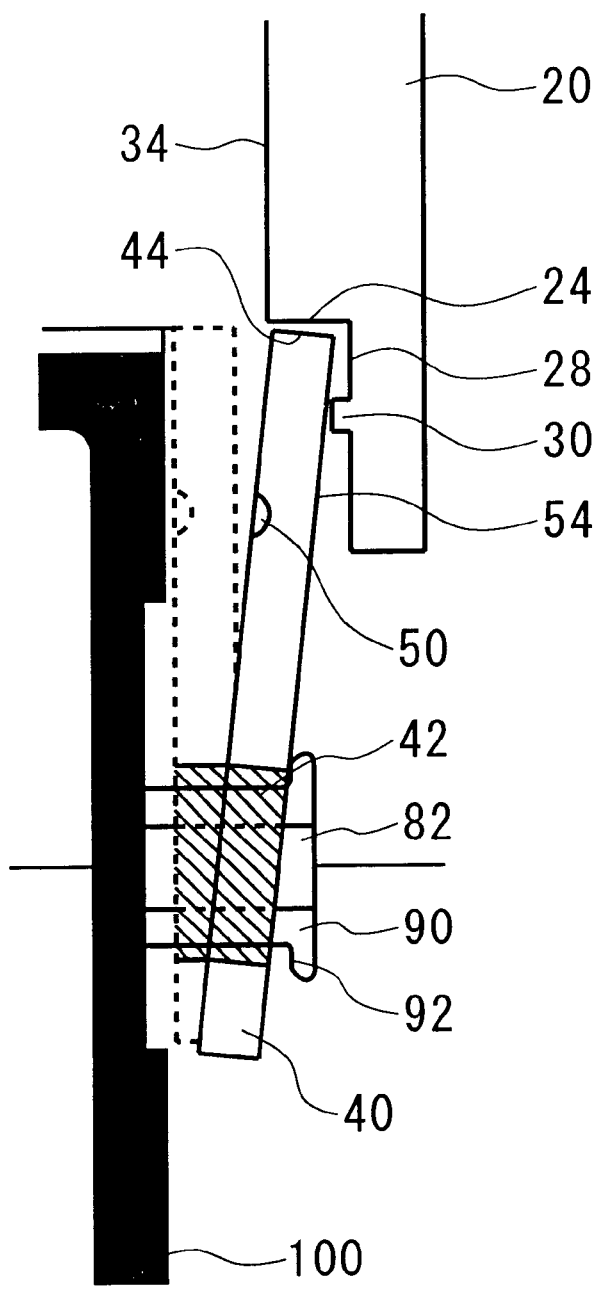
FIG. 5 a cross-sectional view of the cam mechanism, taken along section line V—V in FIG. 4, illustrates a lock member and a cam member of the cam mechanism in accordance with the present invention when the flash part moves from the extended position toward the retracted position.

FIG. 5 illustrates the respective positions of the lock member 40 and the cam member 20 during movement of the flash part 200 from the extended position 210 toward the retracted position 220, in a view along a horizontal direction perpendicular to the axial direction of the lock rotary shaft 82. The cam member 20 includes an inner cam engaging part 24 for engaging the lock member 40 when the flash part 200 moves toward the retracted position 220 from the extended position 210, a guiding part 28 for guiding the lock member 40 during said movement, and a convex part 30 on which the lock member 40 slides. The lock member 40 includes an upper lock engaging part 44 for engaging with the inner cam engaging part 24.

The lock rotary shaft 82 extends through the lock through-hole 42, and has a collar 90. A gap, which is large enough for the inner side hook part 50 and the lock member 40 to be inclined outwardly when pushed in the axial direction of the lock rotary shaft 82, is formed between the peripheral wall of the lock through-hole 42 and the lock rotary shaft 82. Namely, the lock through-hole 42 is loosely fit on the lock rotary shaft 82. Therefore, the upper lock engaging part 44 is inclined towards the inner side of the cam member 20 and capable of engaging with the inner cam engaging part 24.

A periphery portion 92 of the collar 90, which is fit to the lock rotary shaft 82, has a diameter larger than the diameter of the lock through-hole 42. Accordingly, it is possible to prevent the lock member 40 from being dislocated from the lock rotary shaft 82.

The lock engaging part 44 is guided in a track or guide provided by the guiding part 28. Thus, the inner cam engaging part 24 and the upper lock engaging part 44 are capable of stable engagement with each other. Further, the friction between the convex part 30 and the lock member 40, when the lock member 40 slides along the convex part 30, is less than the friction that would be present in contact between the lock member 40 and the guiding part 28 without the convex part 30. In this way, the lock member 40 is capable of being driven with a smaller torque by providing the convex part 30.

Figure 6A:
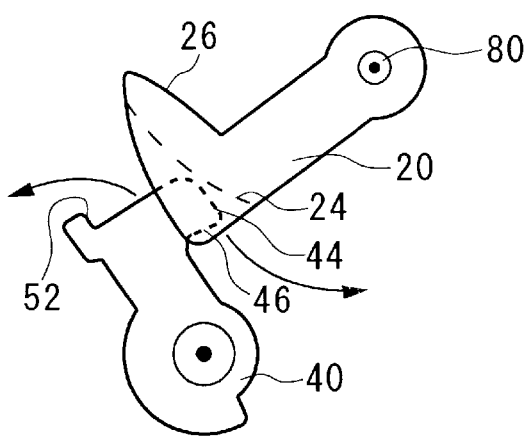
FIGS. 6A to 6D illustrate movements of the lock member and the cam member of the cam mechanism in accordance with the invention when the flash part moves between the extended position and the retracted position.

FIGS. 6A to 6D illustrate movements of the lock member 40 and the cam member 20 during movement of the flash part 200 between the extended position 210 and the retracted position 220. FIG. 6A illustrates the lock member 40 and the cam member 20 when the flash part 200 is positioned at the protruding position 210. In FIG. 6A, the engagement between the cam engaging part 26 and the lock engaging part 46 is released. The cam engaging part 26 is positioned above the lock engaging part 46 by the pressure of the cam rotary spring 60, and the inner engaging part 24 comes to engage with the upper lock engaging part 44, such that the lock member 40 stops.

Figure 6B:
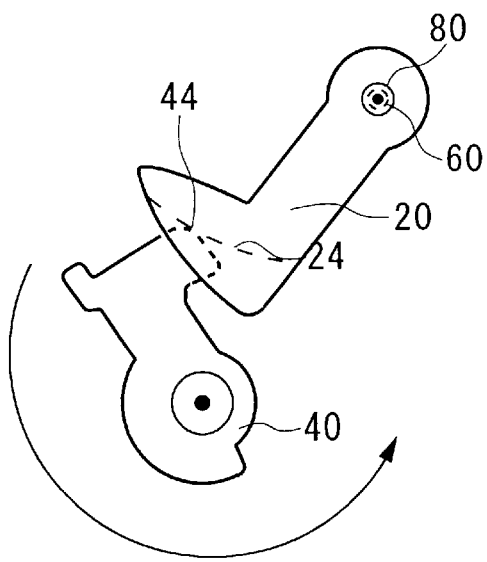

FIG. 6B illustrates the lock member 40 and the cam member 20 as the flash part 200 is pushed and moves to the retracted position 220 from the extended position 210. When the flash part 200 is pushed toward the retracted position 220, the cam member 20 rotates in the counterclockwise direction, against the pressure of the cam rotary spring 60. At this stage, the inner cam engaging part 24 urges or pushes the upper lock engaging part 44 in the counterclockwise direction. The lock member 40 is guided and moved in the counterclockwise direction against the resistance of the rotary movement part 72.

Figure 6C:
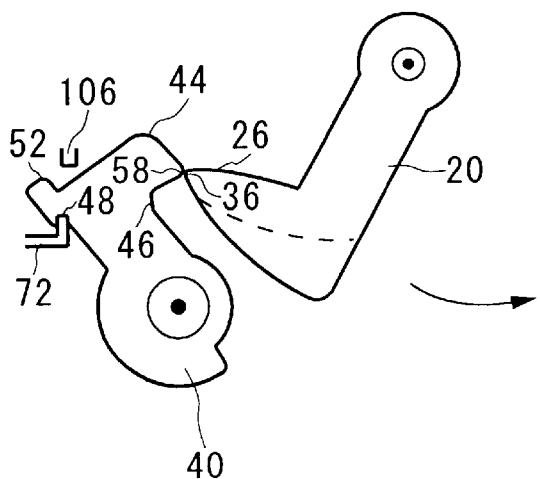

FIG. 6C illustrates the lock member 40 and the cam member 20 when the lock member 40 is moved by the cam member 20 and a cam engagement starting part 36 of the top portion of the inner cam engaging part 24 and a lock engagement starting part 58 of the top portion of the upper lock engaging part 44 arrive at a position for them to engage. From this position, the moving directions of the cam member 20 and the lock member 40 are reversed. The rotary movement part 72 now pushes the cam engagement starting part 36 in the counterclockwise direction through the lock engagement starting part 58. Accordingly, the cam engaging part 26 and the lock engaging part 46 are engaged with each other. In addition, the lock member 40 rotates in the clockwise direction by the pressure of the rotary movement part 72 and the cam engaging part 26 is urged in the counterclockwise direction.

Figure 6D:
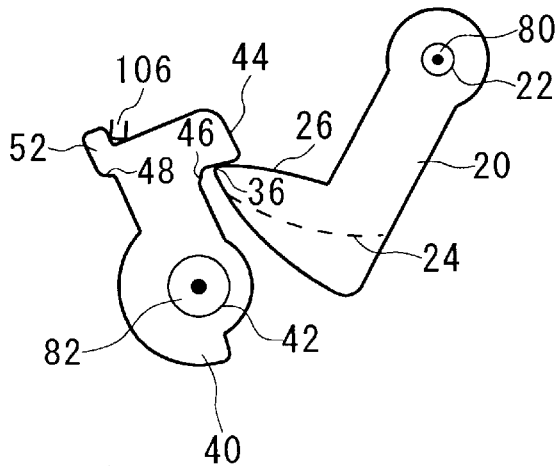

FIG. 6D illustrates the lock member 40 and the cam member 20 when the flash part 200 is at the retracted position 220. For the lock member 40, the clockwise rotation is restricted by the rotary control part 52 engaging the lock control part 106, and the cam engaging part 26 and the lock engaging part 46 are engaged with each other. Accordingly, the flash part 200 is held at the retracted position 220.

When the lock releasing or flash button 250 is pushed by a user with the flash part 200 in the retracted position the inner side hook part 50 is pushed towards the container part 100 (FIG. 5), the lock engaging part 46 moves toward the side of the container part 100, against the resistance of the axial movement part 74, and the engagement with the cam engaging part 26 is released. The cam member 20 is rotated in the clockwise direction by the cam rotary spring 60. Accordingly, the flash part 200 extends toward the extended position 210 from the retracted position 220, and the cam member 20 and the lock member 40 return to the positions of FIG. 6A.

Figure 7:
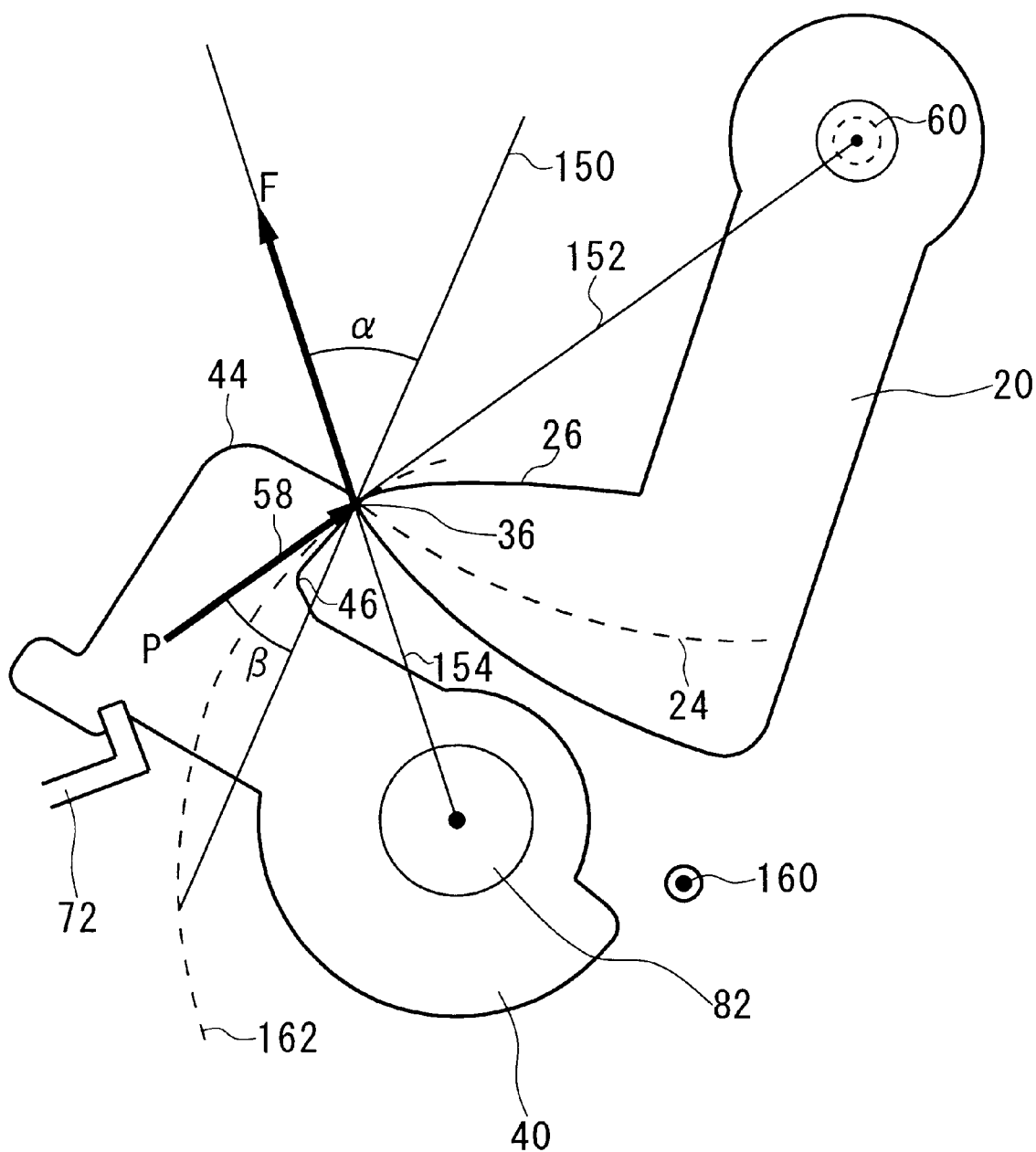
FIG. 7 illustrates the shape of the lock member and the cam member in accordance with the invention, as relating to the operation of the lock member and the cam member illustrated in FIGS. 6A to 6D.

FIG. 7 illustrates the shape of the lock member 40 and the cam member 20 for the operation of the lock member 40 and the cam member 20 as illustrated in FIGS. 6A to 6D. In FIG. 7, the cam engagement starting part 36 and the lock engagement starting part 58 engage with each other. At this stage, an acute angle α is formed by straight lines 150 and 154, in which straight line 150 is tangential to the contact point of the cam engagement starting part 36 and the lock engagement starting part 58 and straight line 154 connects the lock rotary shaft 82 and the lock engagement starting part 58. An acute angle β is formed by straight lines 150 and 152, in which straight line 150 is tangential to the contact point of the cam engagement starting part 36 and the lock engagement starting part 58 and straight line 152 connects the cam rotary shaft 80 and the cam engagement starting part 36. The push or pressure, which is given to the cam engagement starting part 36 by the lock engagement starting part 58, is defined as P. The push or pressure, which the cam member 20 receives in the clockwise direction, is defined as F. Thus, the following equation (1) is obtained. Here, λ of equation (1) is a friction angle and is related to a friction coefficient $\mu$ by the equation (2).

$$F = P \{cos(\alpha+\lambda)\}/\{cos(\beta-\lambda)\} \quad (1)$$

$$\lambda = cot^{-1}\mu \quad (2)$$

In equation (1), if the value of F is greater than 0, the lock engagement starting part 58 has sufficient power to move the cam engagement starting part 36. On the other hand, if the value of F is less than 0, the lock engagement starting part 58 does not have sufficient power to move the cam engagement starting part 36.

The relative strengths of the lock rotary spring 70 and the cam rotary spring 60 in the cam mechanism 300 of the preferred embodiment of the present invention and the relative positions of the cam rotary shaft 80 and the lock rotary shaft 82 are determined in such a way so that the value of F in equation (1) is greater than 0. Namely, it is advantageous if the relative strengths of the lock rotary spring 70 and the cam rotary spring 60 and the relative positions of the cam rotary shaft 80 and the lock rotary shaft 82 are selected in such a way so that when the lock member 40 is urged or pushed by the cam member 20, and the inner cam engaging part 24 and the upper lock engaging part 44 engage with each other, the cam engagement starting part 36 and the lock engagement starting part 58 reach a point where they contact each other and the cam member 20 can be urged or pushed by the lock member 40.

Further, the curvature of the lock engaging part 46 corresponds to the circumference 162 of a circle having a center 160 at the right hand side of the lock rotary shaft 82. Accordingly, the cam engaging part 26 is pushed toward the counterclockwise direction when engaged by the lock engaging part 46. Thus, when the flash part 200 is in the retracted position 220, it is possible to prevent the flash part 200 from rising or lifting toward the extended position 210 after it reaches the retracted position 220. Advantageously, a gap between the flash part 200 and the housing of the camera 10 can be eliminated.

Figure 8:
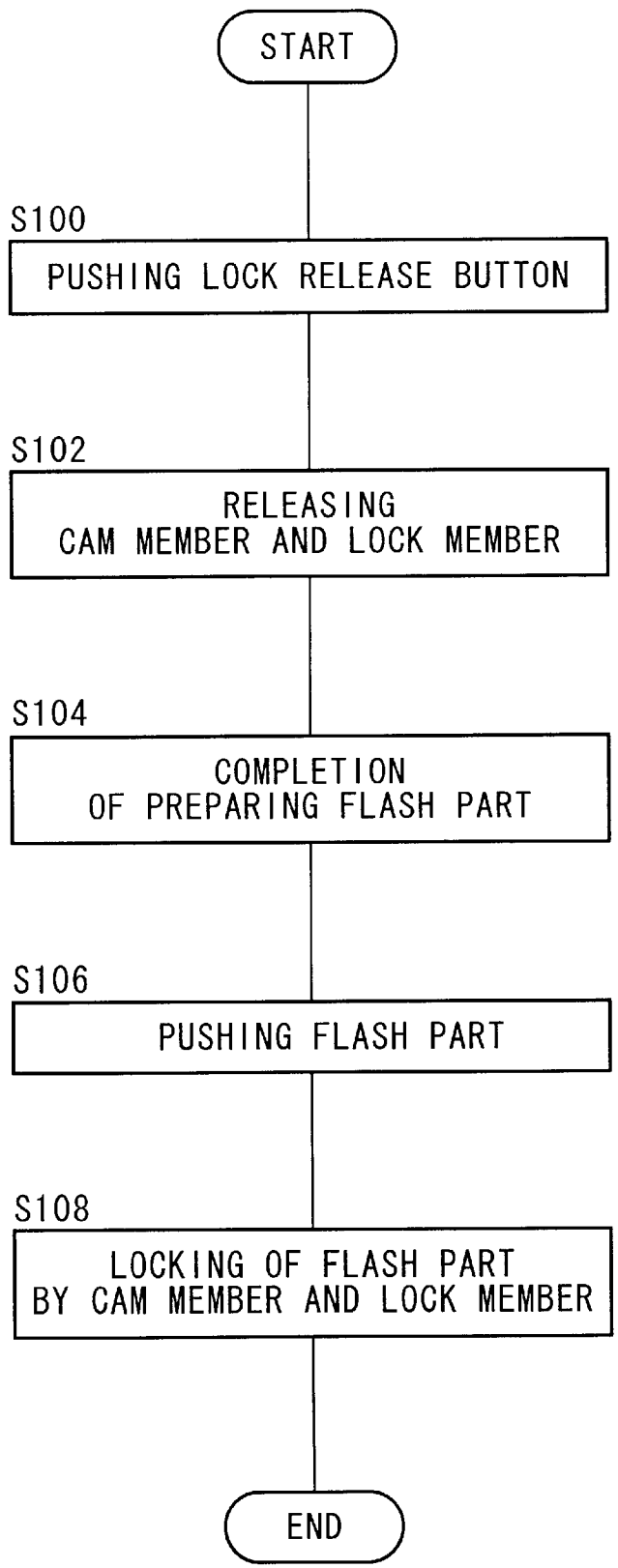
FIG. 8 is a flowchart of the process of the pop-up operation of the flash part by the cam mechanism.

FIG. 8 is a flowchart of the process of the pop-up operation of the flash part 200 by the cam mechanism 300. When a flash photograph is to be taken, the user pushes the lock releasing button 250 for extending the flash part 200 toward the extended position 210 from the retracted position 220 (S100). Alternatively, the digital camera 10, subject to the condition where the flash is required, can automatically extend the flash part 200 to the extended position 210. Next, the engagement between the cam engaging part 26 and the lock engaging part 46 is released, and then the flash part 200 moves to the extended position 210 from the retracted position 220 (S102). Thus, the preparation for taking the flash photograph is completed. The user takes the flash photograph (S104). After completion of the photograph, the flash part 200 is pushed toward the retracted position 220 by the user (S106), the inner cam engaging part 24 and the upper lock engaging part 44 engage with each other, and then the flash part 200 is pushed to the retracted position 220 and locked in the retracted position 220 (S108). Thus, the operation of retraction of the flash part 200 is terminated.

The process of fabricating or assembling the flash part 200, the container part 100, and the cam mechanism 300 of a preferred embodiment of the present invention is explained hereinafter.

Figures 9A, 9B:
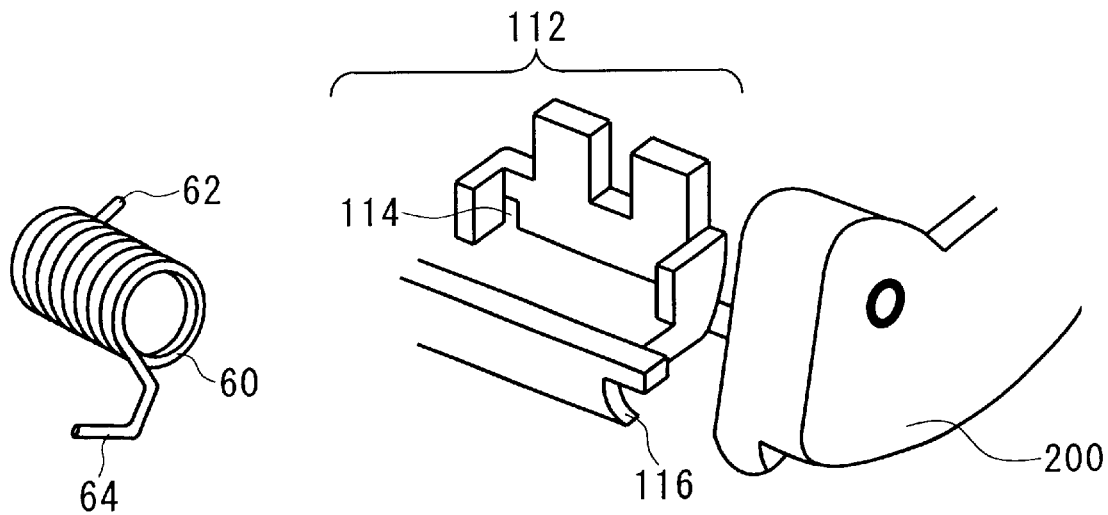
FIGS. 9A and 9B are perspective views of a cam rotary spring and a cam rotary spring container part in accordance with the invention.

FIG. 9A is a perspective view of the cam rotary spring 60. FIG. 9B is a perspective view of a cam rotary spring container part 112. The cam rotary spring container part 112 includes a spring hole 114 and a cam rotary spring holder part 116. The first end 62 of the cam rotary spring 60 is hooked up at the spring hole 114. The cam rotary spring 60 is arranged such that it presses or urges the cam member 20. The second end 64 of the cam rotary spring 60 is hooked up at the cam rotary spring holder part 116. Accordingly, the cam rotary spring 60 is capable of being hooked up on the cam rotary shaft 80.

Figure 10:
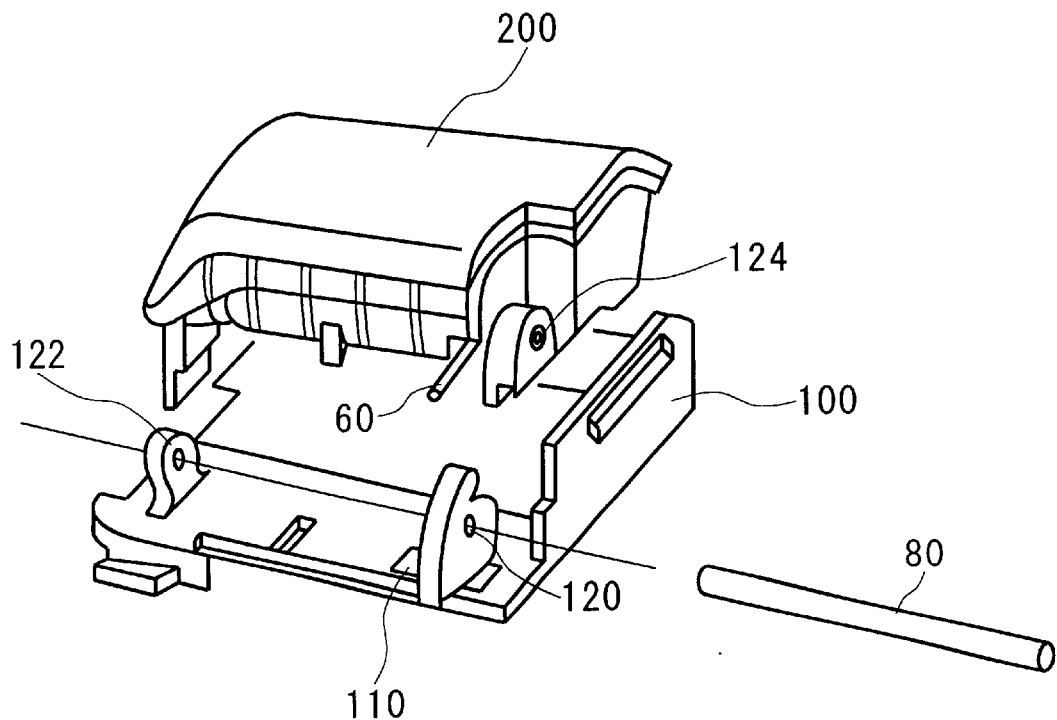
FIG. 10 illustrates the flash part, in an exploded view, as installed in the container part.

FIG. 10 shows the flash part 200 installed in the container part 100. The container part 100 includes a cam rotary spring fixing part 110 for hooking the cam rotary spring 60, the first axis hole 120, and the second axis hole 122 for the cam rotary shaft 80. The cam rotary spring 60 is supported by the cam rotary spring fixing part 110 while being contained in the cam rotary spring container part 112 of the flash part 200. At this stage, the cam rotary spring 60 exerts a pressure on the cam member 20. Accordingly, the cam rotary spring 60 moves the flash part 200 by moving the cam member 20, i.e. rotates the flash part 200 to the extended position 210. The cam rotary shaft 80 extends through the first axis hole 120, the third axis hole 124 of the flash part 200, the cam rotary spring 60, and the second axis hole 122, The cam rotary shaft 80 supports the flash part 200 in a rotatable way.

Figure 11:
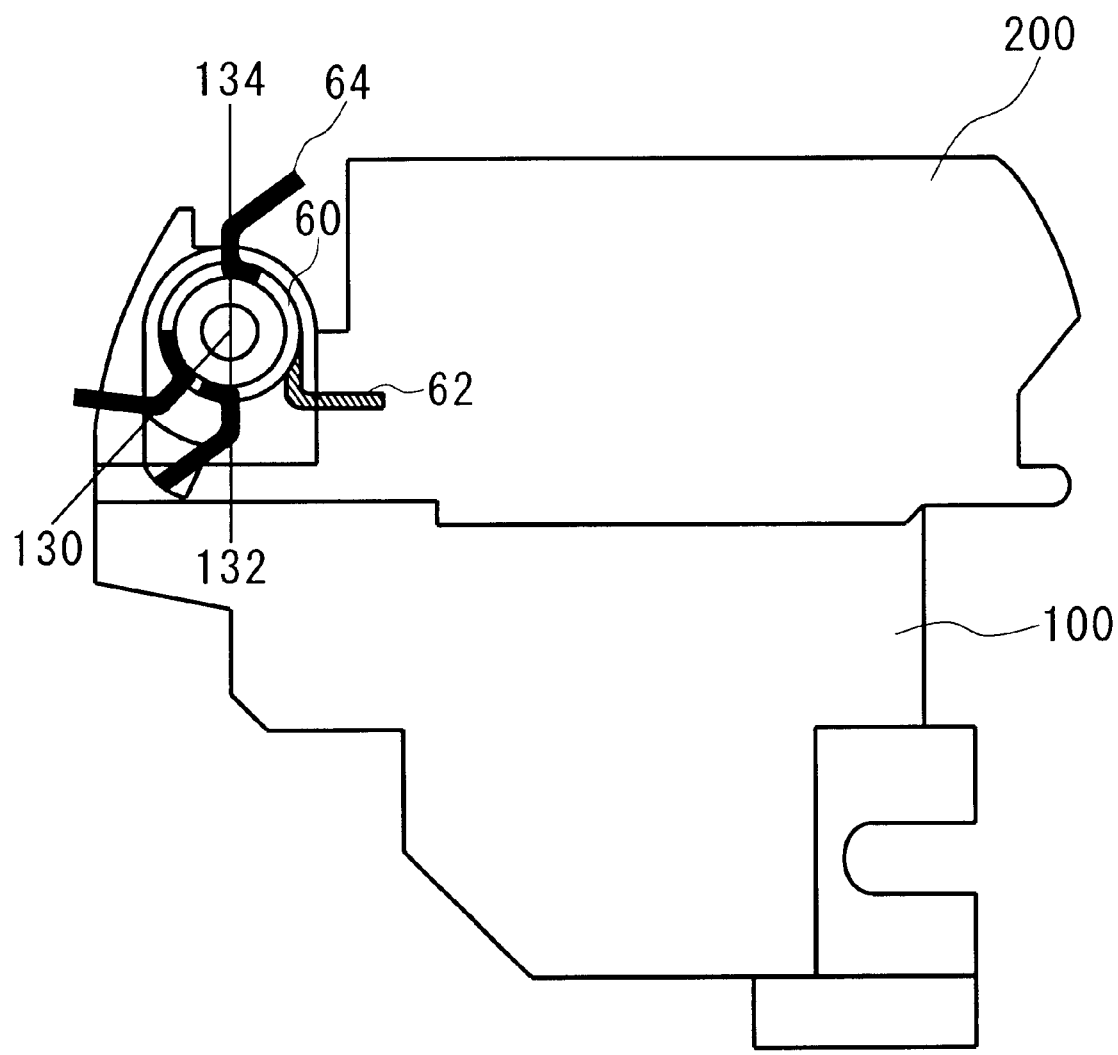
FIG. 11 illustrates the positions of the cam rotary spring during operation of the cam mechanism.

FIG. 11 illustrates the cam rotary spring 60 installed in the flash part 200 and the container part 100. The second end 64, when the flash part 200 is in the retracted position 220, is positioned at a cam rotary spring support part snap position 132. At this stage, the cam rotary spring 60 is loaded to the maximum extent. Further, when the second end 64 is hooked on the cam rotary spring holder part 116, the second end 64 is positioned at a claw hook position 130. A free position 134 indicates the position of the second end 64 when the second end 64 is not loaded. In this way, the second end 64 is supported by the cam rotary spring support part snap position 132 and thus the cam rotary spring is loaded. Therefore, it is possible to move the flash part 200 toward the extended position 210 from the retracted position 220. Here, when the flash part 200 moves to the extended position 210, the first end 62 rotates.

Figure 12:
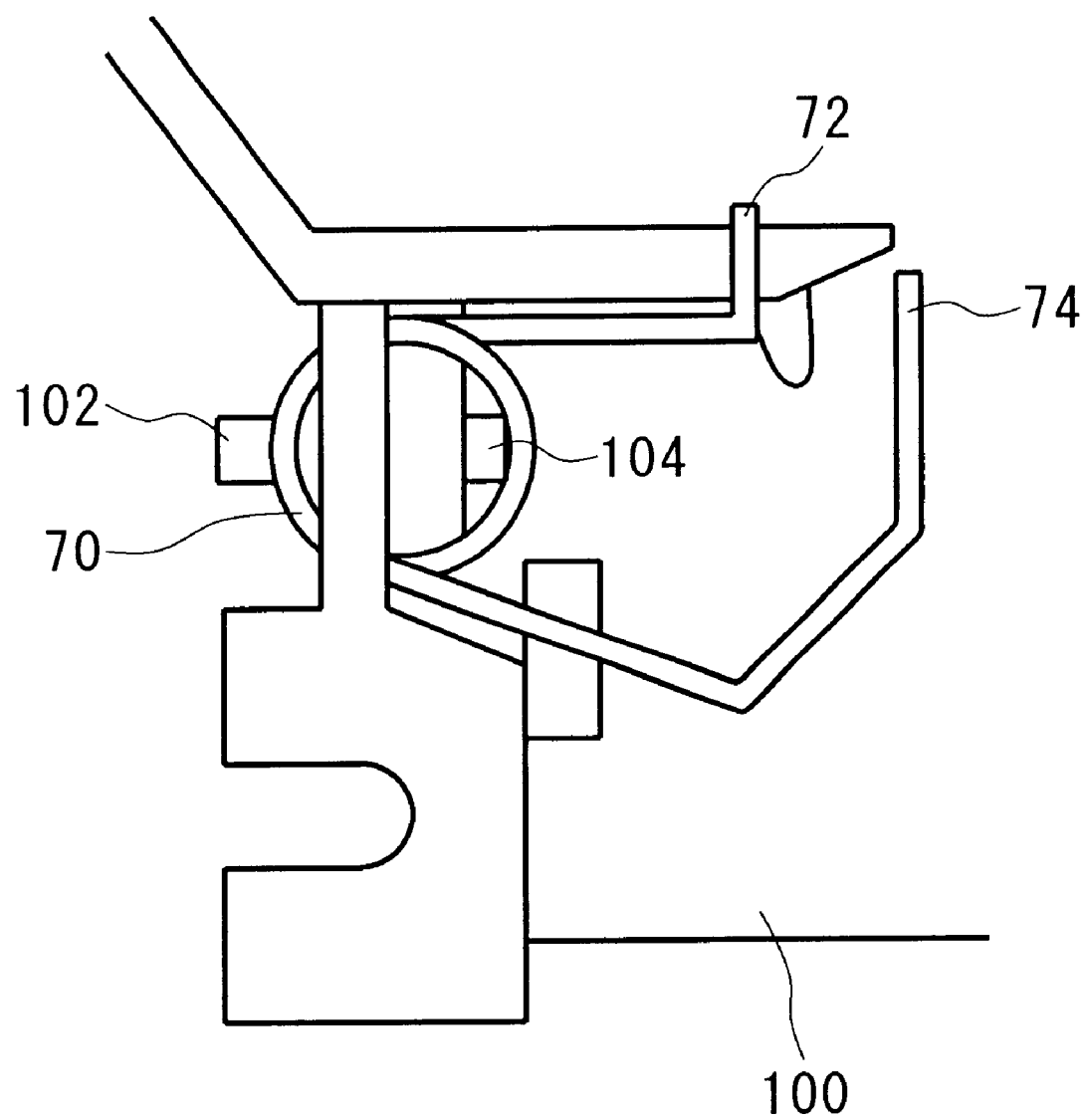
FIG. 12 illustrates the container part and a lock rotary spring when the lock rotary spring is installed in the container part.

FIG. 12 illustrates the container part 100 and the lock rotary spring 70 when the lock rotary spring 70 is installed in the container part 100. A ring portion of the lock rotary spring 70 is hooked up on the spring hooks 102 and 104. Accordingly, the lock rotary spring 70 is fixed to the container part 100.

Advantageously, the convex part 30 may be formed or disposed on a portion of a surface 54 (see FIG. 5), which touches the guiding part 28, of the lock member 40. Although, the convex part 30 is formed on the guiding part 28 of the cam member 20 in a preferred embodiment.

In the preferred embodiment described above, when the hook part 50 is urged toward the surface 54, the lock member 40 pivots in such a posture that the lock engaging part 44 of the lock member 40 is angled toward the surface 54 so that the lock member comes into engagement with the inner cam engaging part 24. However, according to a second modification, the lock member 40 may be supported on the lock rotary shaft 82 so that the lock member 40 moves entirely in parallel toward the surface 54 when the hook part 50 is urged toward the surface 54.

Further, even though the lock engaging part 46, in the preferred embodiment, is formed so that its curvature corresponds to the curvature of the circumference of a circle which has its center shifted to the right of the lock rotary shaft 82 of the lock member 40, it is sufficient for the cam member 20 to have any suitable shape that causes it to be pushed in the counterclockwise direction by the lock member 40 when the cam engaging part 26 engages with the lock engaging part 46.

In the preferred embodiment described above, the cam member 20 is provided with the guide member 28. However, according to another advantageous modification of the invention, the cam member 20 may be designed so that the cam engaging part 24 is formed with a groove in which the lock engaging part 44 fits. In this case, the cam engaging part 24 is capable of engaging in stable with the lock engaging part 44, like the case where the guide member 28 is provided. In addition, there may be another arrangement in which both the guide member 28 and the groove are formed.

Figure 13:
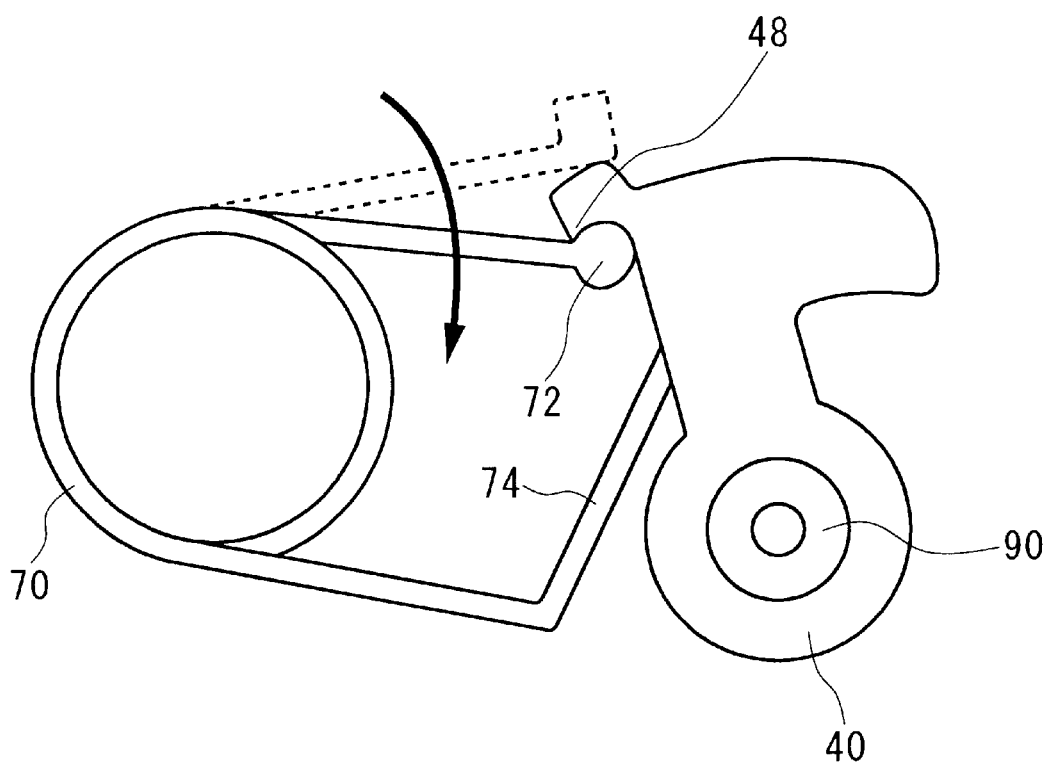
FIG. 13 illustrates the lock rotary spring and a lock member when the lock member is installed in the container part.

FIG. 13 illustrates the lock rotary spring 70 and the lock member 40 when the lock member 40 is installed in the container part 100. The axial movement part 74 is associated with the inner side hook part 50, and the lock member 40 and the collar 90 are retained on the lock rotary shaft 82. The rotary movement part 72 is loaded at the downwardly projecting hook part 48. Thus, assembly of the cam mechanism 300, the container part 100, and the flash part 200 is completed.

Figure 14:
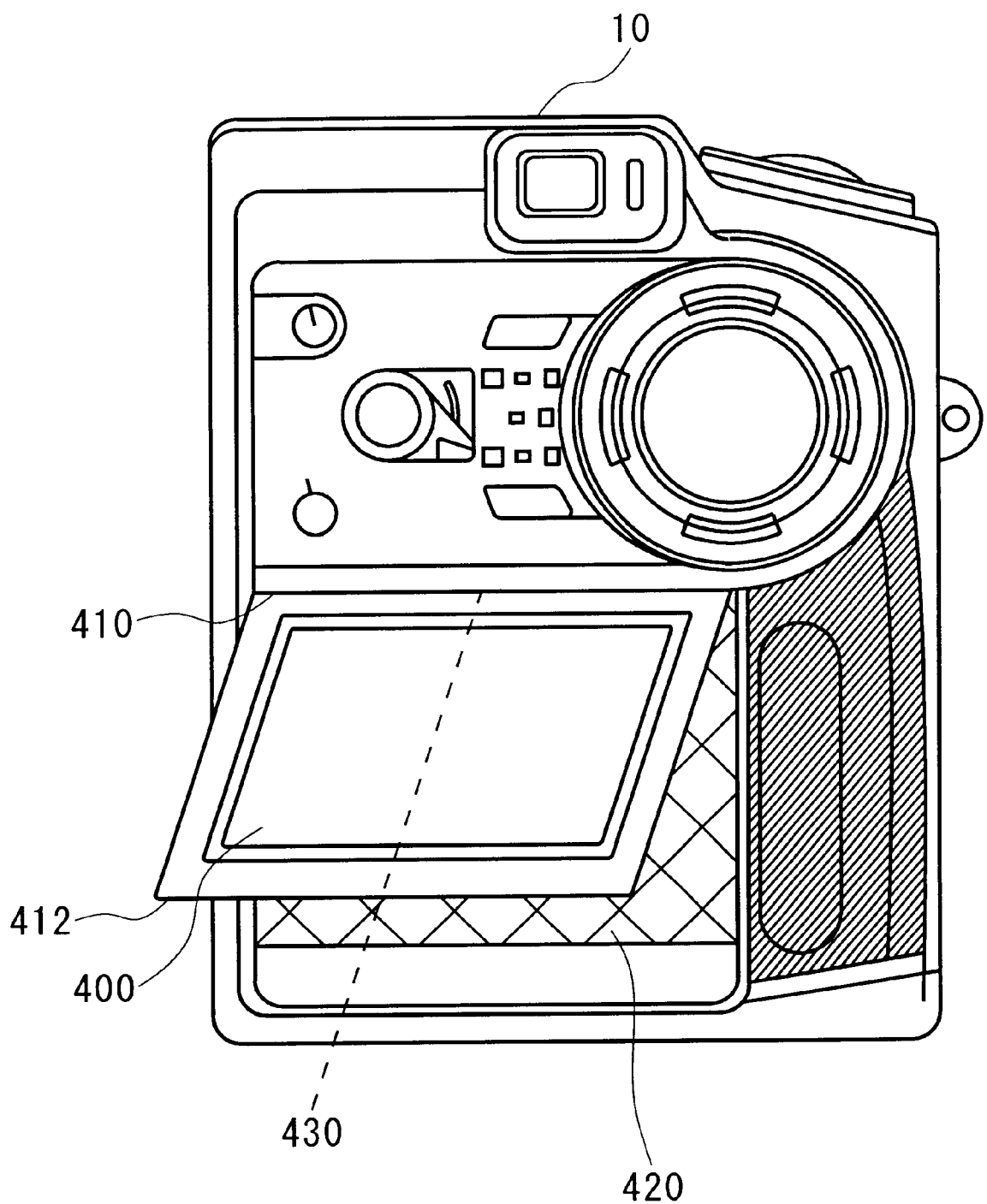
FIG. 14 illustrates a digital camera of a second preferred embodiment in accordance with the present invention.

FIG. 14 illustrates a digital camera 10 of a second preferred embodiment of the present invention. The digital camera 10 of a second preferred embodiment includes an LCD monitor 400 and an LCD monitor container part 420. In a preferred embodiment, the LCD monitor 400, as a substitute for the flash part 200, extends from the digital camera 10 by way of the pop-up mechanism of the cam mechanism 300. In this, the present preferred embodiment differs from the first preferred embodiment.

The LCD monitor 400 is installed in the LCD monitor container part 420 formed in the body of the digital camera 10. In an upper end 410 of the LCD monitor 400, an axis, which is not shown in the drawing, corresponding to the cam rotary shaft 80 in the first preferred embodiment, is provided, and the spring is fit to this axis. This spring pushes the LCD monitor 400 toward an extended position such that the LCD monitor 400 protrudes from the camera 10. The LCD monitor 400 moves to an extended position 430 from the LCD monitor container part 420 by way of the cam mechanism 300. The structure and the operation of the cam mechanism 300 installed in the LCD monitor 400 and the LCD monitor container part 420 are the same as the structure and the operation of the cam mechanism 300 installed in the container part 100 and the flash part 200. Since the structure and operation of the cam mechanism 300 were explained using FIGS. 2 to 7 in the first preferred embodiment, description is not repeated for this embodiment of the invention.

After reading and understanding the foregoing description of preferred embodiments of the invention, in conjunction with the illustrative drawings, it will be appreciated that several distinct advantages of the subject cam mechanism are obtained.

A preferred embodiment of the cam mechanism has a substantially planar or flat shape cam member which moves substantially in a first plane and a substantially planar or flat shape lock member that is driven substantially in the first plane pushed by movement of the cam member. The lock member prevents movement of the cam member when the cam member reaches a predetermined position, and the restriction of movement by the cam member is released by the lock member being moved in a substantially perpendicular direction to the first plane. A first spring is provided for spring-loaded movement of the lock member so that movement of the cam member is prevented.

The cam mechanism may further include a second spring for moving the cam member. The lock member may restrict the movement of the cam member caused by the pressure of the second spring. The cam mechanism may further include a third spring for moving the lock member in a direction that is opposite to the perpendicular direction with respect to the first plane.

Preferably, the first spring and the third spring may be integrated as a torsion spring. An end of the torsion spring may push the lock member for movement in the first plane, and the other end of the torsion spring may push or urge the lock member in a direction that is opposite to the perpendicular direction.

The lock member may be urged in a direction that is opposite to the spring-loaded movement of the lock member by the first spring when the cam member moves in a direction that is opposite to the direction of movement caused by the second spring, with the restriction of the movement of the cam member being released.

The cam mechanism may further include a first axis for supporting the lock member in a rotatable way and a second axis for supporting the cam member in a rotatable way. The first spring may energize or urge the lock member in a first rotary direction about the first axis as a center and the second spring may energize or urge the cam member in a second rotary direction about the second axis as a center.

The lock member may include a through-hole for receiving the first axis. A gap large enough so that at least a part of the lock member can be moved toward the axis may be formed between the lock member and the first axis.

The cam mechanism may further include a collar fixed to the first axis. The collar has a diameter larger than the diameter of the through-hole in the lock member so that the lock member is retained on the axis.

The cam member may include a guide or track formed in an inner surface thereof, which is parallel with the first plane, and the lock member may be guided in the guide or track when the lock member is urged to move by a guiding part of the cam member.

A protrusion extending in a direction perpendicular to the first plane may be formed on one of a side of the lock member and the cam member.

The lock member may include an engaging part for engaging the cam member so that, when the cam member reaches a predetermined position, movement of the cam member is prevented by the resistance of the engaging part, which is provided by the first spring.

The cam member may be pushed by the engaging part in a direction that is opposite to the direction towards which the second spring pushes the cam member when the engaging part prevents movement of the cam member by application of the first spring.

The range of movement of the cam member may be restricted in a distance between a first position of the cam member when its restriction of movement is released and a second position of the cam member when the lock member engages therewith.

The cam mechanism may further include a spring support part for charging and supporting the second spring in order for the second spring to move the cam member.

In accordance with a second preferred embodiment of the present invention, a camera for taking a picture includes a substantially planar or flat shape cam member, which moves substantially in a first surface plane. A substantially planar or flat shape lock member is provided that moves substantially in the first plane when pushed by the cam member during the movement of the cam member, and prevents movement of the cam member when the cam member reaches a predetermined position. A lock release button is provided for moving the lock member in a perpendicular direction to the first plane for releasing the restriction of movement of the cam member and a flash means that can be extended from the camera body by the cam member when the lock release button is pushed.

Without attempting to set forth all of the desirable features and advantages of the instant cam mechanism, at least some of the major advantages of the invention are detailed below.

Primarily, the invention provides for easy assembly and operability of the cam mechanism. The cam mechanism is amenable to miniaturization while providing robust and reliable functionality as a pop-up mechanism.

In describing the invention, reference has been made to preferred embodiments and illustrative advantages of the invention. Those skilled in the art, however, and familiar with the instant disclosure of the subject invention, may recognize additions, deletions, modifications, substitutions and other changes that fall within the scope of the subject invention.

What is claimed is:

1. A cam mechanism for a device that is movable between a first position and a second position, said cam mechanism comprising;
   a cam member for movement substantially in a first plane;
   a lock member for movement substantially in said first plane when said cam member is moved from a first position to a second position; said lock member including a retaining part for retaining said cam member at a predetermined position and said retaining part being movable in a direction substantially perpendicular to said first plane to release said cam member;
   a first spring for moving said lock member to a position for retaining said cam member; and
   a second spring for moving said cam member, wherein said lock member retains said cam member against movement caused by the second spring.

2. A cam mechanism according to claim 1, further comprising:
   a third spring for moving said lock member in an opposite direction to said perpendicular direction.

3. A cam mechanism according to claim 2, wherein said first spring and said third spring are formed integrally as a torsion spring, one end of the torsion spring causes said lock member to move in said first plane, and the other end of said torsion spring causes said lock member to move in an opposite direction to said perpendicular direction.

4. A cam mechanism according to claim 1, wherein when said cam member is moved from said first position to said second position, in an opposite direction to said movement caused by said second spring, with the movement of said cam member being released, said lock member is moved substantially in said first plane in an opposite direction to said movement caused by said first spring.

5. A cam mechanism according to claim 1, further comprising:
   a first axis for supporting said lock member in a rotatable way; and a second axis for supporting said cam member in a rotatable way, wherein said first spring causes movement of said lock member in a first rotary direction about said first axis and said second spring causes movement of said cam member in a second rotary direction about said second axis.

6. A cam mechanism according to claim 5, wherein said lock member includes a through-hole for receiving said first axis; and a gap between said lock member and said first axis for at least one part of said lock member to move toward said first axis to contact a corresponding part of said cam member.

7. A cam mechanism according to claim 6, further comprising:
   a collar at said first axis, wherein said collar has an outer diameter greater than a diameter of the through-hole and said collar rotatably retains said lock member on said first axis.

8. A cam mechanism according to claim 5, wherein relative strengths of said first spring and said second spring and relative positions of said first axis and said second axis are such that, when said lock member is moved by movement of said cam member, corresponding parts of said cam member and said lock member are engaged so that said cam member is urged by said lock member to said predetermined position to be retained.

9. A cam mechanism according to claim 1, further comprising:
   a spring support part for charging and supporting said second spring for said second spring to move said cam member.

10. A cam mechanism according to claim 1, wherein said lock member includes an engaging part for engaging with said cam member, and said cam member is retained by the engaging part being moved by said first spring when said cam member reaches a predetermined position.

11. A cam mechanism according to claim 10, wherein the engaging part causes said cam member to move in an opposite direction to a direction of said movement caused by said second spring when said engaging part retains said cam member by being moved by said first spring.

12. A cam mechanism according to claim 10, wherein a range of movement of said cam member is limited to between said first position of said cam member when said cam member is released for movement and said second position of said cam member when said lock member engages therewith.

13. A cam mechanism according to claim 1, wherein said cam member and said lock member have a generally flat, planar configuration.

14. A cam mechanism according to claim 1, wherein said lock member has an end face and a side face which are both engaged with said cam member when said lock member is in said predetermined position.

15. A cam mechanism according to claim 14, wherein said side face of said lock member engages a projection extending from a side face of said cam member.

16. A cam mechanism for a device that is movable between a first position and a second position, said cam mechanism comprising:

a cam member for movement substantially in a first plane;

a lock member for movement substantially in said first plane when said cam member is moved from a first position to a second position; said lock member including a retaining part for retaining said cam member at a predetermined position and said retaining part being movable in a first direction substantially perpendicular to said first plane to release said cam member; and a first spring for moving said lock member to a position for retaining said cam member, wherein said cam member includes a guide part extending along a side of said cam member and parallel with the first plane, said retaining part of said lock member being urged in a second direction opposite to said first direction toward said guide part.

17. A cam mechanism according to claim 16, further comprising:

a convex part protruding in a perpendicular direction to the first plane, said convex part being disposed between said lock member and said guide part of said cam member.

18. A cam mechanism according to claim 17, wherein said convex part is located on said guide part.

19. In combination, a cam mechanism and a device having a pop-up part, said cam mechanism comprising:

a cam member connected with said pop-up part and arranged for movement substantially in a first plane when said pop-up part is extended and retracted;

a lock member for engaging said cam member and arranged for movement substantially in said first plane caused by movement of said cam member; said lock member retaining said cam member at a predetermined position by said engagement and releasing said cam member for movement thereof when said lock member is moved in a direction substantially perpendicular to said first plane;

a first spring having a first part for moving said lock member to retain said cam member and a second part for moving said lock member in a direction opposite to said perpendicular direction; and a second spring for moving said cam member.

20. A camera comprising:

a cam member for movement substantially in a first plane;

a lock member for engaging said cam member and being moved substantially in said first plane by movement of said cam member; said lock member having a retaining part for retaining said cam member at a predetermined position;

a lock release button for moving said lock member in a direction substantially perpendicular to said first plane to release said cam member for movement in said first plane;

a pop-up part connected with said cam member for protruding from said camera body when said button is activated;

a first biasing member for moving said lock member to a position for retaining said cam member; and a second biasing member for moving said cam member.

21. A cam mechanism for a camera having a part that is moveable between a first position and a second position, said cam mechanism comprising:

(a) a cam member that moves with the camera part;

(b) a lock member including an extension part having a first engagement part, a second engagement part and a third engagement part, said first engagement part of said lock member retains said cam member at a predetermined position and is movable in a first direction to release said cam member for movement with the camera part;

(c) a first axis that supports said lock member for rotation around said first axis;

(d) a first spring that engages said second engagement part of said lock member for rotation of said lock member around said first axis to retain said cam member; and (e) a second spring that engages said third engagement part of said lock member for movement of said first engagement part of said lock member in a second direction opposite to said first direction, wherein said extension part of said lock member extends in a radial direction from said first axis such that said first engagement part, second engagement part and third engagement part are located on a same side of said first axis.

22. A cam mechanism according to claim 21, further comprising:

a third spring that moves said cam member, wherein said first engagement part of said lock member retains said cam member against movement by the third spring.

23. A cam mechanism according to claim 22, wherein said first spring and said second spring are integrated as a torsion spring, one end of the torsion spring engages said second engagement part of said lock member for rotation of said lock member substantially in a first plane, and the other end of said torsion spring engages said third engagement part of said lock member for movement of said first engagement part in said second direction substantially perpendicular to said first plane.

24. A cam mechanism according to claim 23, further comprising:

a second axis that supports said cam member for rotation around said second axis substantially in said first plane.

25. A cam mechanism according to claim 22, wherein said first engagement part of said lock member urges said cam member in an opposite direction to a direction of said movement of said cam member by said third spring when said first engagement part retains said cam member by said lock member being rotated by said first spring.

26. A cam mechanism according to claim 21, wherein each of said cam member and said lock member has a generally flat, planar configuration.

27. A cam mechanism according to claim 21, wherein said extension part has a generally flat, planar configuration, said first engagement part and said second engagement part are located at opposite side edges, respectively, of said radially extending extension part and said third engagement part is located between said first engagement part and said second engagement part on a surface of said extension part between said opposite side edges.

28. A cam mechanism according to claim 21, wherein said cam member includes a guide part that extends along a side of said cam member, said first engagement part of said lock member being urged in said second direction toward said guide part.

29. A cam mechanism according to claim 21, wherein said lock member has an end face and a side face which are both engaged with said cam member when said lock member rotates around said first axis for retaining said cam member.

30. A cam mechanism according to claim 21, wherein the camera is a compact digital camera and the camera part is at least one of a pop-up flash mechanism and a pop-up LCD monitor.

31. A cam mechanism for a compact camera having a pop-up part, said cam mechanism comprising:
(a) a cam member having a generally flat, planar configuration structured and arranged for rotational movement with the pop-up part, said cam member rotates substantially in a first plane around a first axis;
(b) a lock member including a radial part having a generally flat, planar configuration for rotational movement substantially in said first plane around a second axis,
said radial part extending away from said second axis in one radial direction thereof toward said cam member and having a first engagement part, a second engagement part and a third engagement part,
said first engagement part retains said cam member at a retracted position of the pop-up part and is movable in a direction substantially perpendicular to said first plane to release said cam member for extending the pop-up part; and
(c) a torsion spring having a first end that engages said second engagement part of said radial part for rotating said radial part around said second axis to retain said cam member and a second end that engages said third engagement part of said radial part for moving said first engagement part in an opposite direction to said perpendicular direction.

32. A cam mechanism according to claim 31, further comprising:
a cam rotary spring that moves said cam member, wherein said first engagement part of said lock member retains said cam member against movement caused by the cam rotary spring.

33. A cam mechanism according to claim 31, wherein said first engagement part and said second engagement part are at respective edges of said radial part and said third engagement part is located between said first engagement part and said second engagement part on a surface of said radial part between said edges.

34. A cam mechanism according to claim 31, wherein the compact camera is a compact digital camera.

35. A cam mechanism for a camera having a pop-up part, said cam mechanism comprising:
(a) a cam member for rotational movement with the pop-up part substantially in a first plane;
(b) a cam rotary spring for moving said cam member, said cam rotary spring having a first end and a second end, said second end of the cam rotary spring having
a claw hook position at which said second end is hooked on a spring holder part of the camera for supporting said cam rotary spring,
a snap position at which the pop-up part is retracted and said cam rotary spring is loaded to a maximum extent, and
a free position at which said cam rotary spring is not loaded,
said first end of the cam rotary spring being rotated when the pop-up part is extended by said loaded cam rotary spring moving said cam member; and
(c) a lock member for rotational movement substantially in said first plane to retain said cam member when said pop-up part is retracted and said lock member being movable in a direction substantially perpendicular to said first plane to release said cam member for the rotational movement.

36. A cam mechanism according to claim 35, further comprising:
a torsion spring having a first end for moving said lock member to retain said cam member and a second end for moving said lock member in an opposite direction to said perpendicular direction.

37. A lock member for a camera having a cam mechanism for spring-loaded movement of a camera part between a retracted position and an extended position, said lock member comprising:
(a) a central part having an axial through-hole for supporting the lock member on a rotational axis for movement of the lock member around said axis when the camera part moves between the extended position and the retracted position, said axial through-hole being sized for said lock member to be moveable in an axial direction while supported on the rotational axis; and
(b) a radial part projecting from said central part in a direction away from said axial through-hole on one radial side with respect to said axial through-hole, said radial part having a side surface, a first side edge, a second side edge, and an end edge at an opposite end of said radial part from said central part,
said first side edge extending outwardly at said end edge of said radial part to form a lock engaging part having a generally hook shape for engaging the cam mechanism to retain the camera part at the retracted position,
a knob part at said second side edge, opposite to said first side edge, including
a first hook part projecting toward said central part for engaging a first biasing member that moves said lock engaging part to engage the cam mechanism, and
a rotary control part projecting away from said central part for engaging a lock control part of the camera that limits movement of said lock engaging part by the first biasing member, and
a second hook part at said side surface of said radial part, between said first and second side edges, for engaging a second biasing member that moves said lock member in a direction opposite to said axial direction,
wherein said lock member has a generally flat, planar configuration.

* * * * *